United States Patent [19]

Tsuruta

[11] 4,019,552
[45] Apr. 26, 1977

[54] REMOTE CONTROL OF PNEUMATIC TIRE PRESSURE AND ITS APPARATUS

[76] Inventor: Yasuo Tsuruta, 22-2, 4-chome, Sanno, Ota, Tokyo, Japan

[22] Filed: Jan. 30, 1975

[21] Appl. No.: 545,631

[30] Foreign Application Priority Data

Mar. 30, 1974 Japan .............................. 49-036154

[52] U.S. Cl. .............................................. 152/417
[51] Int. Cl.² ...................................... B60C 23/10
[58] Field of Search .............. 301/5 R, 38 R, 39 R, 301/41 R, 44, 45, 46; 60/533; 152/415, 416, 417, 418, 1, 5, 8, 9, 10

[56] References Cited

UNITED STATES PATENTS

| 2,733,572 | 2/1956 | Butteffield | 60/533 |
|---|---|---|---|
| 2,940,772 | 6/1960 | Heiss | 60/533 |
| 3,120,255 | 2/1964 | Coppola | 301/45 |
| 3,184,268 | 5/1965 | Blindenbacher | 301/45 |
| 3,362,452 | 1/1968 | Harnish | 152/416 |
| 3,805,912 | 4/1974 | Mattson | 152/416 |

FOREIGN PATENTS OR APPLICATIONS 12,439  2/1913  United Kingdom ............... 152/418

Primary Examiner—Stanley H. Tollberg
Attorney, Agent, or Firm—Brisebois & Kruger

[57] ABSTRACT

Apparatus for remotely controlling the pressure in a pneumatic tire in which a pneumatic chamber communicating with a tube inserted in a tire and a chamber whose internal pressure is remote-controlled from the cab are aligned on the same axle of a vehicle. The piston penetrates into both chambers and the internal pressure in the tube can be adjusted by changing the internal volume of the pneumatic chamber due to displacement of the piston.

8 Claims, 4 Drawing Figures

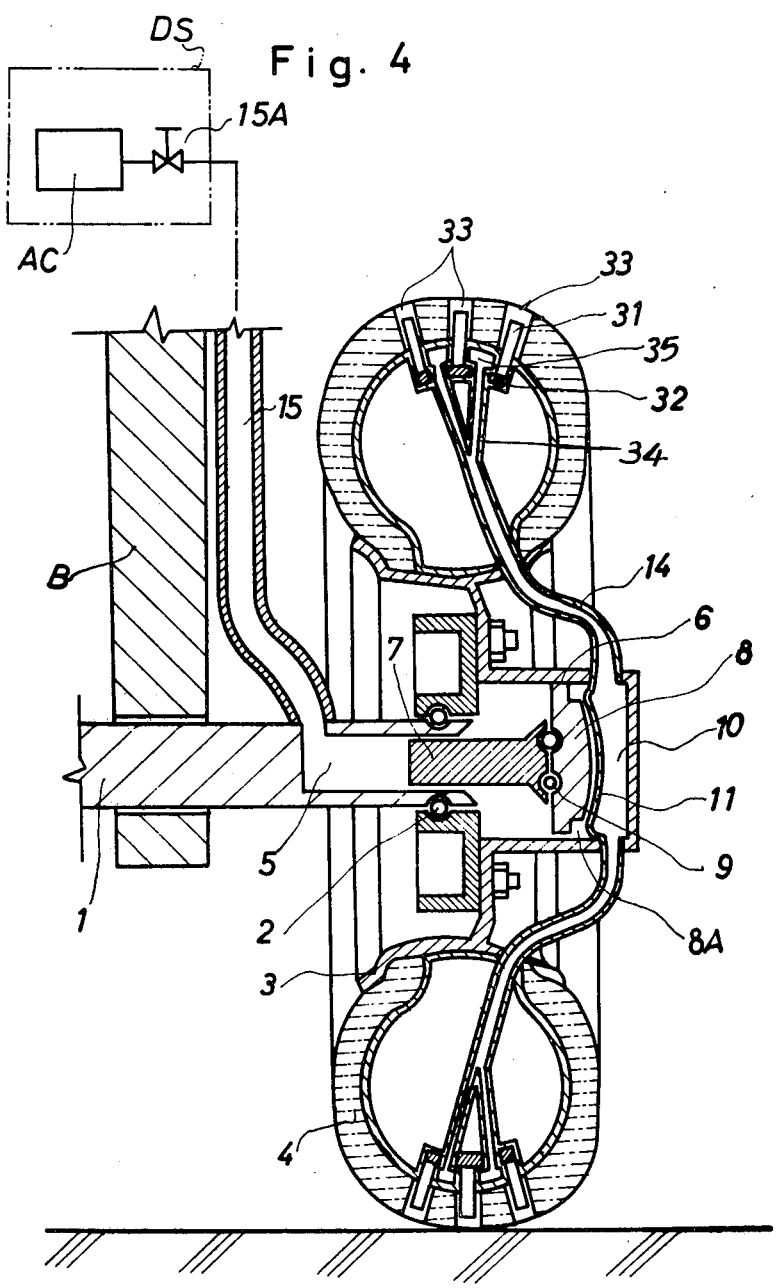

REMOTE CONTROL OF PNEUMATIC TIRE PRESSURE AND ITS APPARATUS

BACKGROUND OF THE INVENTION

The present invention relates to a method of controlling the pneumatic pressure in a vehicle tire and to apparatus for carrying out this method. More specifically, the invention relates to a method of remote-controlling the pneumatic tire pressure from the vehicle cab, regardless of whether the vehicle is running or standing still, and apparatus for carrying out this method.

BRIEF DESCRIPTION OF THE PRIOR ART

In a vehicle it is desirable that the internal pressure in the vehicle tires be adjustable while the vehicle is running. Let it be supposed that a vehicle runs continuously over roads having different surface conditions. If the vehicle whose tire pressure has been set at a high value adapted to high speed operation over an expressway happens to be operated over a bad road, there will be a risk that the run will become bumpy and the control of the steering wheel may be lost. Conversely, if a vehicle whose tire pressure has been set at a low value adapted to the running conditions over a bad road happens to be operated on an expressway, there will be a risk that a standing wave or hydroplaning may occur. In the case of aircraft whose tire pressure is always kept high so that the tire can withstand a tremendous shock momentarily encountered at landing, the high internal pressure of the tire is maintained even during mooring or when in flight, and in consequence the tires whose fatigue is thus accelerated are likely to burst on landing.

No device, however, has been available which can adjust the pneumatic pressure in the tires of a vehicle or aircraft while in operation.

SUMMARY OF THE INVENTION

The object of the present invention is to provide a method of freely adjusting the internal pressure in a tire through remote control from the vehicle cab, regardless of whether the vehicle is running or standing still, and to provide apparatus for carrying out this method.

Another object of the present invention is to provide an apparatus for adjusting the internal pressure of the tube in a tire by changing the internal volume of a pneumatic chamber communicating with the tube and thereby pressure-feeding air from said chamber into the tube.

Still another object of the present invention is to provide an apparatus for adjusting the internal pressure within said pneumatic chamber by displacing a piston in said chamber by remote control from the cab of the vehicle.

Still another object of the present invention is to provide an apparatus for adjusting the internal pressure within a tube by changing the volume of a pneumatic chamber by linearly displacing a piston along the same axis as that of the wheel axle.

Still another object of the present invention is to provide an apparatus in which the pressure developed by changing the volume of the pneumatic chamber is utilized as means for projecting or withdrawing spikes installed on the tire tread surface.

Other objects of the present invention will become apparent from the following detailed description of several embodiments of the present invention, with reference to the accompanying drawings, in which:

FIG. 4 is a longitudinal sectional view of the wheel according to a third embodiment of the invention, in which the invention is used to project or withdraw spikes from the tread surface.

DETAILED DESCRIPTION OF THE DRAWINGS

Figure 1:
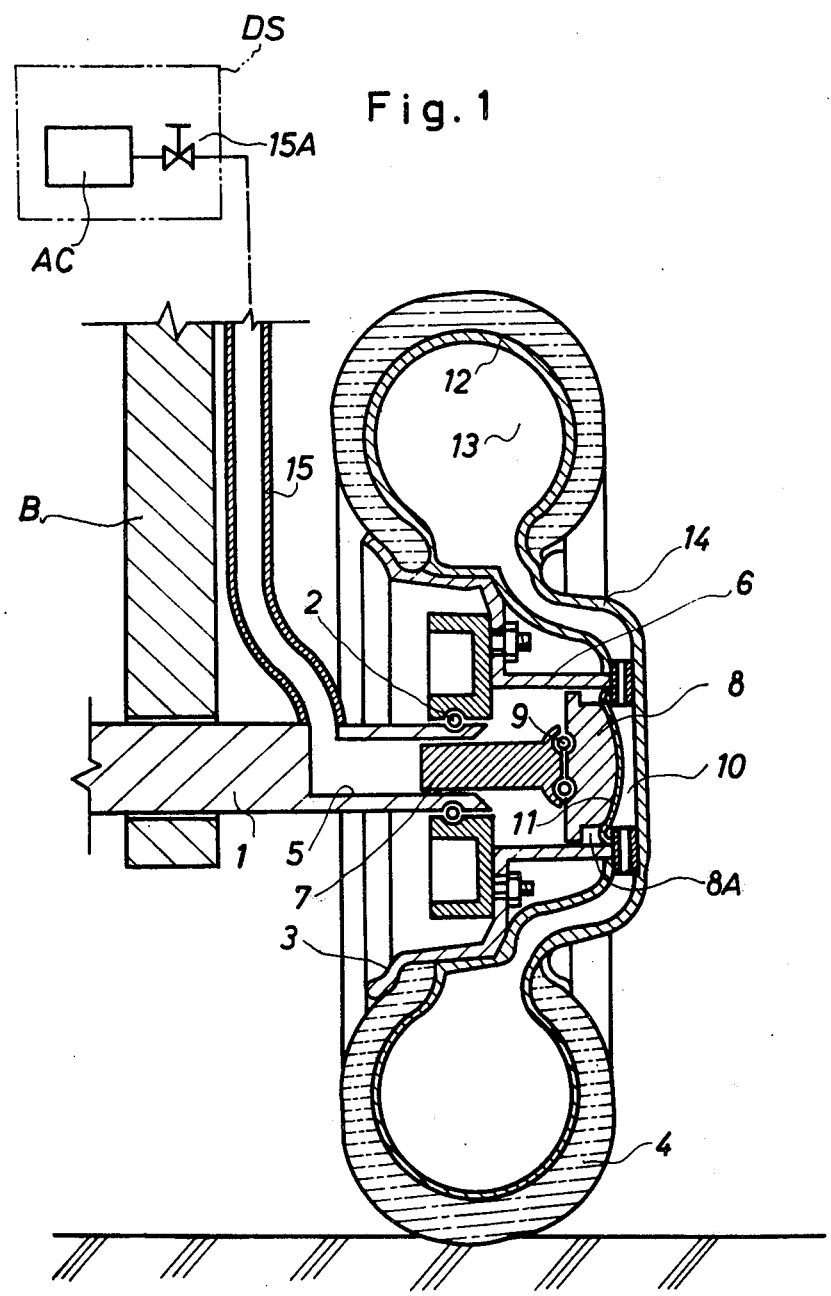
FIG. 1 is a longitudinal sectional view illustrating a first embodiment of the invention, with the tube on the wheel inflated to a high pressure.
Figure 2:
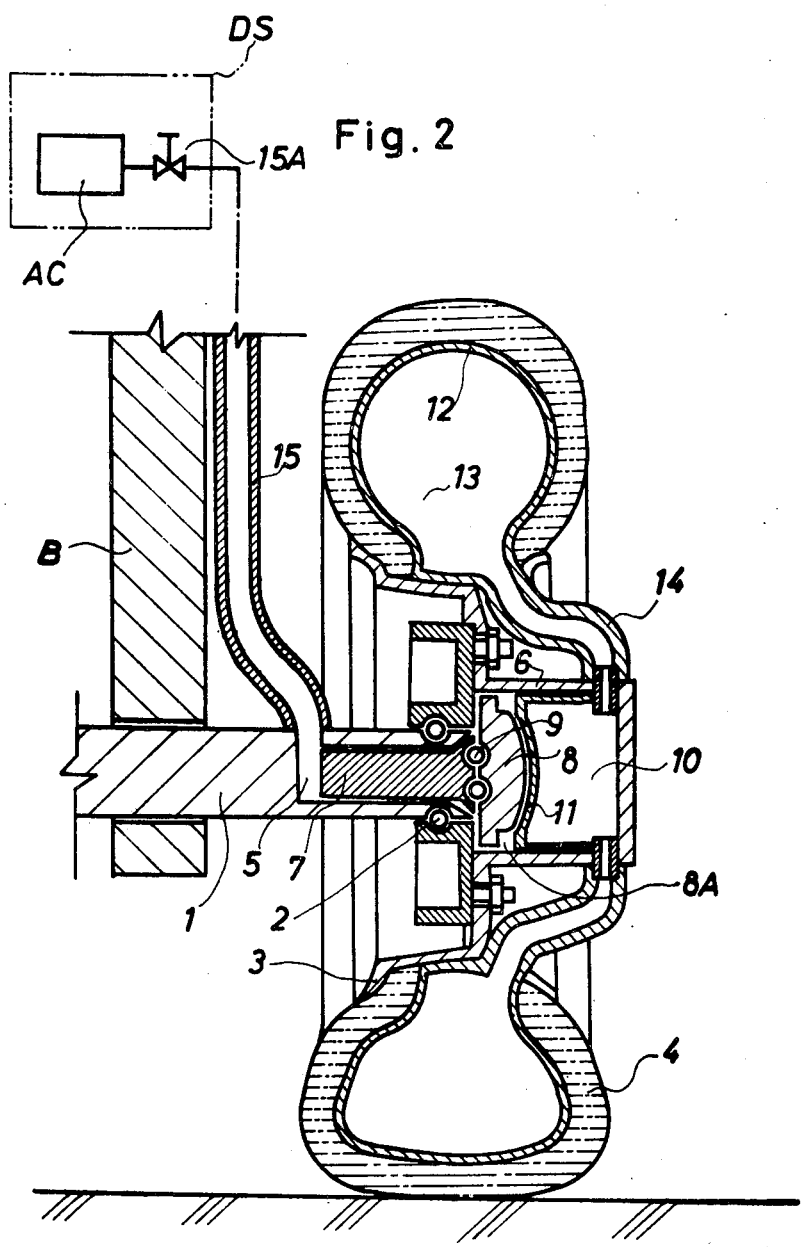
FIG. 2 is a longitudinal sectional view showing the tube of FIG. 1 deflated to a low pressure.

As shown in FIGS. 1 and 2, a rim 3 is mounted on a bearing 2 around the end of an axle 1 supported by the body B of an automobile or aircraft and a tire 4 is mounted on the rim 3. At the end of the axle 1 is an inner cylindrical chamber 5. A casing 6 is also provided at the end of the axle 1, in which a first piston 7 projecting into the cylinder 5 and a second piston 8 inside the casing 6 are connected by a ball bearing 9. The inside of the casing 6, which is divided by the second piston 8, comprises on one side of said piston a pneumatic chamber 10, in which a flexible, airtight diaphragm 11 is stretched over the end face of the second piston 8 and attached to the internal wall of the casing 6, thereby maintaining the internal airtightness of the pneumatic chamber 10. The inner diameter of the cylindrical chamber 5 is smaller than that of the pneumatic chamber 10. Thus the two chambers 5, 10 form a mechanism for increasing the pressure in proportion to the difference in diameter, depending on the ratio between the cross-section of the first piston 7 and that of the second piston 8. A pressure-proof hose 14 connects the chamber 10 with an air space 13 in a tube 12 within the tire 1. At the same time a pressure-supply pipe 15 communicating with a compressor AC of the cab DS of the vehicle is connected to the cylinder chamber 5 beyond the first piston 7, the pressure-supply pipe 15 being provided with a flow-control valve 15 A. The pipe 15 and the cylinder chamber 5 are filled with a fluid.

The following description assumes that the piston is actuated by a non-compressible liquid filling the cylinder chamber 5, but it goes without saying that compressed air may be used instead of the liquid.

When the tire has to be inflated to a high pressure, as when a vehicle is to travel at high speed or when an aircraft is to make a landing, a pressurized fluid is fed into the cylinder chamber 5 through means remotely controlled from the cab, as shown in FIG. 1. Thereupon the first piston 7, receiving the pressure, is displaced toward the casing 6. As a result, the second piston 8 is also moved, by compressing the pneumatic chamber 10 to drive the air therein through the pressure-proof hose 14 into the air space 13 within the tube 12, resulting in an increased pressure in the air space 13. Thus the tire 4 can be inflated to a high pressure suitable for high speed operation of the vehicle or to an adequate pressure for absorbing the shock received by the landing gear of a landing aircraft.

The high-speed rotation of the tire is transmitted to the casing 6 and this is accompanied by the rotation of the second piston 8. The transmission of the torque to the first piston 7, however, is inhibited by the ball bearing 9 interposed between the first piston 7 and the second piston 8. This absence of torque on the first piston 7 prevents any loss of liquid-tightness in the cylinder chamber 5 or any pressure change therein. Meanwhile a gap 8A is left around the second piston 8 and a liquid filling said gap acts as a lubricant of the interface between the second piston 8 and the diaphragm 11 and prevents the diaphragm 11 from being squeezed between said piston 8 and the casing 6.

When it is desirable to have a low internal pressure in the tire, as when the vehicle is to run at low speed over a bad road or when the aircraft is in flight, through remote control from the cab the internal pressure of the cylinder chamber 5 is reduced. Then, as illustrated in FIG. 2, the second piston 8, receiving the pressure from the air space 13 in the tube 12, is pushed back in the casing 6, whereby the pressure in the air space 13 in the tube 12 drops, relaxing the tire and making it soft and flexible. Thus the pressure in the pneumatic chamber 10 can be set at an arbitrary value by adjusting the pressure in the cylindrical chamber 5.

Figure 3:
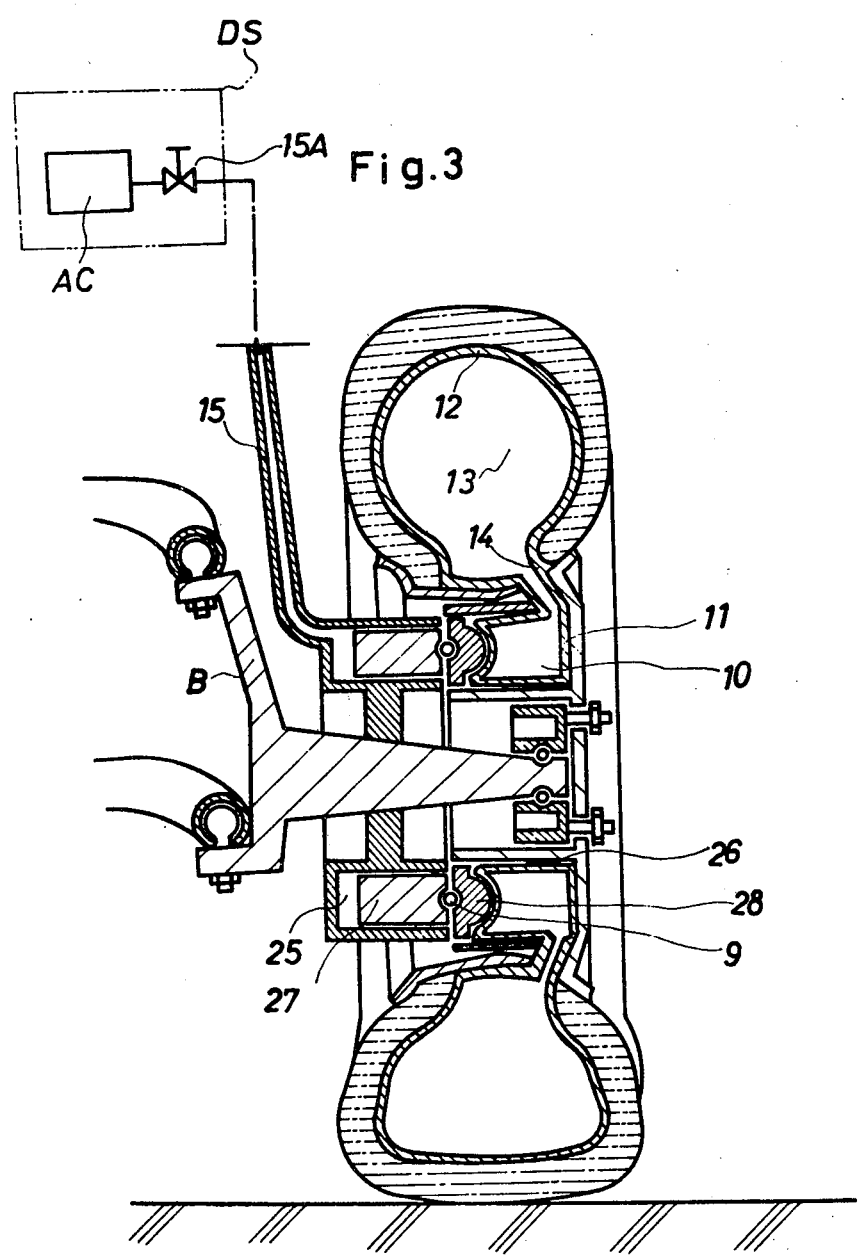
FIG. 3 is a longitudinal sectional view showing the tube of a second embodiment deflated to a low pressure.

FIG. 3 illustrates a second embodiment of the present invention. In this embodiment a cylindrical chamber 25 and a casing 26 are constructed in annular form. An air bag 11 is provided in the pneumatic chamber 10 in the casing 26 and communicates with the air space 13 in the tube 12 through the pressure-proof hose 14. In opposition to said air bag 11 there is provided the second piston 28, while a first piston 27 within the cylinder chamber 25 is connected through the ball bearing 9 to the second piston 28. The cylindrical chamber 25 receiving the first piston 27 communicates with the pressure-supply pipe 15 which leads to the compressor AC of the cab DS and a fluid is sealed within this pipe 15.

In this embodiment, as in the first one, the first and second pistons 27, 28 are displaced by remote control from the cab DS, thereby changing the volume of the pneumatic chamber 10 and adjusting the pressure in the air space 13 in the tube 12.

The above description relates to cases in which the present invention is applied to adjust the pressure in the air space in the tube. In the embodiment illustrated in FIG. 4, the present invention is used to provide drive means for projecting or withdrawing spikes from the tread surface.

A plate 32 embedded with spikes 31 is provided within the tire. The spikes 31 are located opposite to the holes 33 in the tire 4. A pressure-proof hose 14 is connected to a smaller tube 34 attached to said plate 32 and communicating with a fluid-tight chamber 35 formed between the plate and the wall of the tire, and the other end of the hose is connected to the pneumatic chamber 10 in the casing 6.

When the pneumatic chamber 10 is compressed by a pressure applied to the second piston 8, the spikes 31 are projected above the tread surface of the tire. The internal pressure of said chamber is transmitted to said smaller tube 34. An increased pressure in the smaller tube 34 causes the spikes 31 to be withdrawn below the tread surface of the tire. Conversely, when the second piston 8 is withdrawn to depressurize the smaller tube 34, the spikes 31, in response to the pressure in the air space 13 in the tube 12 are projected through small holes from the tread surface of the tire 1.

Thus according to the present invention in which a piston is linearly displaced within a cylindrical chamber by remote control, the pneumatic chamber is compressed in dependence on the amount of displacement, and the pressure of the pneumatic chamber is transmitted to the tube in the tire. The pressure in the pneumatic chamber, i.e., the pneumatic tire pressure can be freely adjusted within certain limits. Thus the remote control of the pneumatic tire pressure without losing airtightness — which has been so far deemed impossible — has been made possible. The pneumatic chamber can be compressed not only by fluid pressure but also by mechanical means. The present invention can also be utilized as a drive source for controlling the projection of spikes from the tread surface of the tire.

What is claimed is:

1. Apparatus for controlling the pressure in a pneumatic tire on a vehicle equipped with a wheel carrying said tire and supporting means on which said wheel is mounted for rotation relative to said supporting means, said apparatus comprising:
    a first variable volume chamber at least partially defined within said supporting means, the volume of which chamber is responsive to changes in fluid pressure supplied thereto from a remotely controlled source of pressure fluid,
    a first piston responsive to changes in the pressure within said chamber,
    a second variable volume chamber in said wheel,
    said second chamber having a flexible wall and being completely sealed except for means connecting said second chamber to a space within a tire when said tire is mounted on said wheel,
    and thrust bearing means for transmitting the movement of said piston to the flexible wall of said second variable volume chamber to vary the volume thereof, without transmitting the rotation of said wheel through said piston to said supporting means.

2. Apparatus as claimed in claim 1 in which said first variable volume chamber is in said axle in axial alignment with said second variable volume chamber and said first piston engages through said bearing means a second piston the movement of which alters the volume of said second variable volume chamber.

3. Apparatus as claimed in claim 1 in which said vehicle is an airplane.

4. Apparatus as claimed in claim 1 in which said chambers are annular, and in axial alignment, and said first piston means engages through said thrust bearing means a second piston the movement of which alters the volume of said second chamber.

5. Apparatus as claimed in claim 1 in which the space within the tire is a fluid-tight expansible third chamber defined between the tire tread and a plate carrying a plurality of spikes projecting through said tread, so that the expansion and contraction of said third chamber controls the extent of any projection by said spikes from said tire tread, and said apparatus comprises at least one tube connecting said second and third chambers.

6. Apparatus for remotely controlling the internal pressure in an air space within a tire, said apparatus comprising:
    a pneumatic chamber coaxially mounted on a wheel,
    a flexible fluid-tight diaphragm dividing said pneumatic chamber into two parts and preventing the transfer of fluid between said parts,
    means for connecting one of said chamber parts to the air space in said tire and means for connecting the other of said chamber parts to a source of fluid under pressure, and means for regulating the flow of fluid under pressure to said other chamber part.

7. Apparatus as claimed in claim 6 in which said one chamber part, the tire enclosing said air space, and the means connecting said one chamber part and air space define a system which is hermetically sealed against the escape of fluid therefrom.

8. Apparatus as claimed in claim 6 in which said means for connecting said other chamber part to said source of fluid under pressure is a duct in an axle on which said wheel is mounted, said wheel is mounted on said axle through bearing means communicating with said other chamber and, except for said bearing means, said other chamber is hermetically sealed against the escape of fluid therefrom.

* * * * *